(12) United States Patent
Juan et al.

(10) Patent No.: US 7,149,169 B2
(45) Date of Patent: Dec. 12, 2006

(54) DISTINGUISHING OPTICAL DISC TYPES

(75) Inventors: Kuan-Kai Juan, Tao-Yuan Hsien (TW);
Kun-Hung Hsieh, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 607 days.

(21) Appl. No.: 10/605,999

(22) Filed: Nov. 13, 2003

(65) Prior Publication Data

US 2005/0105433 A1 May 19, 2005

(51) Int. Cl.
*G11B 7/00* (2006.01)
(52) U.S. Cl. .................................. 369/53.22
(58) Field of Classification Search ...................... None
See application file for complete search history.

(56) References Cited

U.S. PATENT DOCUMENTS

| | | | |
|---|---|---|---|
| 5,003,521 A | 3/1991 | Yoshida et al. | |
| 6,021,102 A | 2/2000 | Seto | |
| 6,052,344 A * | 4/2000 | Ueki | 369/44.27 |
| 6,058,082 A1 | 5/2002 | Hwang | |
| 6,501,712 B1 | 12/2002 | Masuda | |
| 6,775,209 B1 * | 8/2004 | Kobayashi | 369/44.29 |
| 6,822,936 B1 * | 11/2004 | Ono et al. | 369/53.23 |
| 6,956,801 B1 * | 10/2005 | Horimoto | 369/53.2 |
| 2004/0022156 A1 * | 2/2004 | Choi | 369/53.22 |

FOREIGN PATENT DOCUMENTS

JP  11149640 A  * 6/1999

* cited by examiner

*Primary Examiner*—William Korzuch
*Assistant Examiner*—Christopher Lamb
(74) *Attorney, Agent, or Firm*—Winston Hsu

(57) ABSTRACT

An optical disc apparatus includes a memory, a control circuit, a motor, a spindle, and a pickup head. When determining the type of optical disc, the optical disc apparatus moves a focusing lens at a constant velocity. A first duration is measured that indicates how much time it takes for the moving focal point of a laser shining through the focusing lens to pass through a first layer of the optical disc. A second duration is also measured that indicates how much time it takes for the moving focal point to move from the first layer to a second layer of the optical disc. A ratio of the second duration to the first duration indicates optical disc type.

19 Claims, 8 Drawing Sheets

DISTINGUISHING OPTICAL DISC TYPES

BACKGROUND OF INVENTION

1. Field of the Invention

The present invention relates to optical disc type discrimination in an optical disc apparatus. More specifically, a device and method for correctly distinguishing optical disc type independent of the velocity of the focusing lens is disclosed.

2. Description of the Prior Art

Many of today's optical disc devices are designed to operate using more than one type of optical disc. For example, a single optical disc drive may be capable of reading/writing at least CD, CD-R, CD-RW, and DVD formats. Because the wavelength of a laser optimized for use with a CD is longer than the wavelength of a laser optimized for use with a DVD, it is of fundamental importance for the modern optical disc apparatus to distinguish automatically, quickly, and correctly, which type of optical disc is currently being utilized. Once the determination has been made, the optical disc apparatus selects the appropriate laser according to the disc type.

Most current optical discs have been standardized to be approximately 12 mm in diameter and about 1.2 mm thick. The optical discs have a protective surface layer and an underlying data layer where the desired information is recorded. Although there may also be differences between the exact structure and composition of the data layer (or layers), one major difference between a CD and a DVD is the respective distance between the surface layer 105, 125 and the data layer 110, 130 as shown in FIG. 1. For a CD 100, this distance is nearly the thickness of the disc, or about 1.2 mm. For a DVD 120, this distance is about half the thickness of the disc, or approximately 0.6 mm.

When determining the type of optical disc currently loaded, the optical disc apparatus normally utilizes a fixed-force to raise and then lower an optical focusing lens within a narrow, predefined range at a constant known velocity. As the lens is moved closer to the optical disc, the focus of the laser moves to the surface layer of the disc, then through the surface layer of the disc, and eventually to the data layer and perhaps beyond. When the direction of motion of the lens is reversed, the focus of the laser again passes through the data layer and eventually through the surface layer of the disc. Because of the different laser wavelengths and relative compositions of CDs and DVDs, a CD will reflect light generated by a laser having a wavelength optimized for a CD better than light from a laser optimized for a DVD. Conversely, a DVD will reflect light from a laser having a wavelength optimized for a DVD better than light generated by a laser optimized for a CD. Reflected light maximizes when the laser focus centers on the data layer or the surface layer.

FIG. 2 illustrates one method to determine optical disc type that uses a focus error (FE) signal. In this example, a CD has been inserted into the optical disc apparatus. Also shown in FIG. 2 is a generated SBAD signal, which is a sum of all reflected light received by sensors in the pickup head of the optical disc apparatus, and an FOSO signal indicating the distance between the lens and the surface of the optical disc. First, a DVD laser is turned on and the lens is moved toward the surface of the disc. As the focus of the laser passes through the surface layer at a point on the chart marked A, reflected light increases somewhat, as is indicated by the SBAD signal. As the laser focus reaches the data layer, marked B, the quantity of reflected light again increases. Note that here, the FE also shows a minor deviation from normal, but the deviation is small. When the movement of the lens toward the disc reaches the end of the predefined range, the DVD laser is turned off, the CD laser is turned on, and lens movement away from the optical disc commences. When the focus of the laser again reaches the data layer (marked C), the levels of reflected light again surges as shown. However, because the optical disc in question happens to be a CD and now a laser with a wavelength optimized for a CD is being used, the FE signal jumps markedly. Because the increase in the FE signal at the data layer is larger with the CD laser than it is with a DVD laser, the optical disc is determined to be a CD.

FIG. 3 illustrates the same scenario when a DVD has been inserted into the optical disc apparatus. The DVD laser is turned on and the lens is forced toward the optical disc. The DVD laser is then turned off and the lens withdrawn from the optical disc. As is clearly shown, this time the largest jump in the FE when the lens is focused on the data layer occurs at B (the FE signal is greater at B than at C). Thus, the unidentified optical disc is determined to be a DVD. Because the method depends entirely upon the relative reflectivity of the different disc layers, consistency in the reflective relationships for each type of optical disc is a requirement often difficult to meet across all optical disc formats, compositions, and manufacturers.

Another common method to distinguish whether a CD or a DVD is being used utilizes the difference in distance between the surface layer and the data layer. U.S. Pat. No. 6,021,102, issued to Seto, et al. and herein incorporated by reference, provides a detailed explanation of one such method. Again, when determining the type of optical disc currently loaded, the optical disc apparatus utilizes a fixed force to raise and then lower an optical lens within a narrow, predefined range at a fixed velocity. However, in this method, using surges in the SBAD signal, the amount of time it takes for the moving lens to shift from being focused on the surface layer until it focuses on the data layer (or visa versa) determines the type of optical disc. Because the velocity of the moving lens is constant and known, once the time is known, the distance between the surface layer and the data layer can be estimated according to the formula Velocity*Time=Distance. The estimated distance indicates the type of disc.

FIG. 4 illustrates an example related time value $T_{cd}$ between surges in the SBAD signal when a CD has been inserted into the optical disc apparatus. FIG. 5 shows the same information when a DVD is loaded. Because the speed of the lens is constant and the distance between the surface layer A and the data layer B in a CD (FIG. 4) is approximately twice the distance between the surface layer A and the data layer B in a DVD (FIG. 5), the value of $T_{CD}$ is approximately twice the value of $T_{DVD}$, allowing for identification of the optical disc type.

The first method requires the reflective relationships of the respective discs to be consistent to work well. However, manufacturing tolerances vary widely and this method is not always applicable. The second method, that of using the distance between the surface layer and the data layer to determine optical disc types predominantly removes the reflectivity problem but introduces a new problem of requiring the precise velocity of the lens to be known. The measurements of the distance between the surface layer and the data layer of an optical disc utilizing various discs and apparatus will generally fall within certain ranges depending upon optical disc type. However, again due to variations in manufacturing tolerances and improvements in technologies, the velocity of the lens may vary considerably from manufacturer to manufacturer and model to model. Inconsistency in velocities across manufacturers may force at least portions of ranges indicating optical disc type to overlap. As a result, the optical disc type may be determined incorrectly.

SUMMARY OF INVENTION

It is therefore a primary objective of the claimed invention to provide a device and method for distinguishing optical disc types that does not depend on the reflectivity of the optical disc or on the velocity of the focusing lens in an optical disc apparatus.

According to the claimed invention, an optical disc apparatus includes a memory, a control circuit, a motor, a spindle, and a pickup head 16. The memory includes programs and thresholds for optical disc type determination according to the present invention and for operation of the optical disc apparatus. Included in the control circuit are one or more timers. The pickup head 16 has at least one laser for emitting light onto an optical disc through a focusing lens and optical sensors for generating signals according to the light reflected from the optical disc.

When determining the type of optical disc, the optical disc apparatus utilizes a fixed force to move the focusing lens at a constant velocity. As the focusing lens is moved towards the optical disc, the focal point of the optical lens moves through the layers of the optical disc. A first duration is measured that indicates how much time it takes for the moving focal point to pass through a first layer of the optical disc. A second duration is also measured that indicates how much time it takes for the moving focal point to move from the first layer to a second layer of the optical disc.

Once the first and second durations are known, the type of optical disc currently loaded can be accurately determined. A ratio of the second duration to the first duration approximates a ratio of the distance between the first and second layers of the optical disc to the thickness of the first layer and can be compared with predefined independent ranges of results to accurately determine optical disc type.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 6:
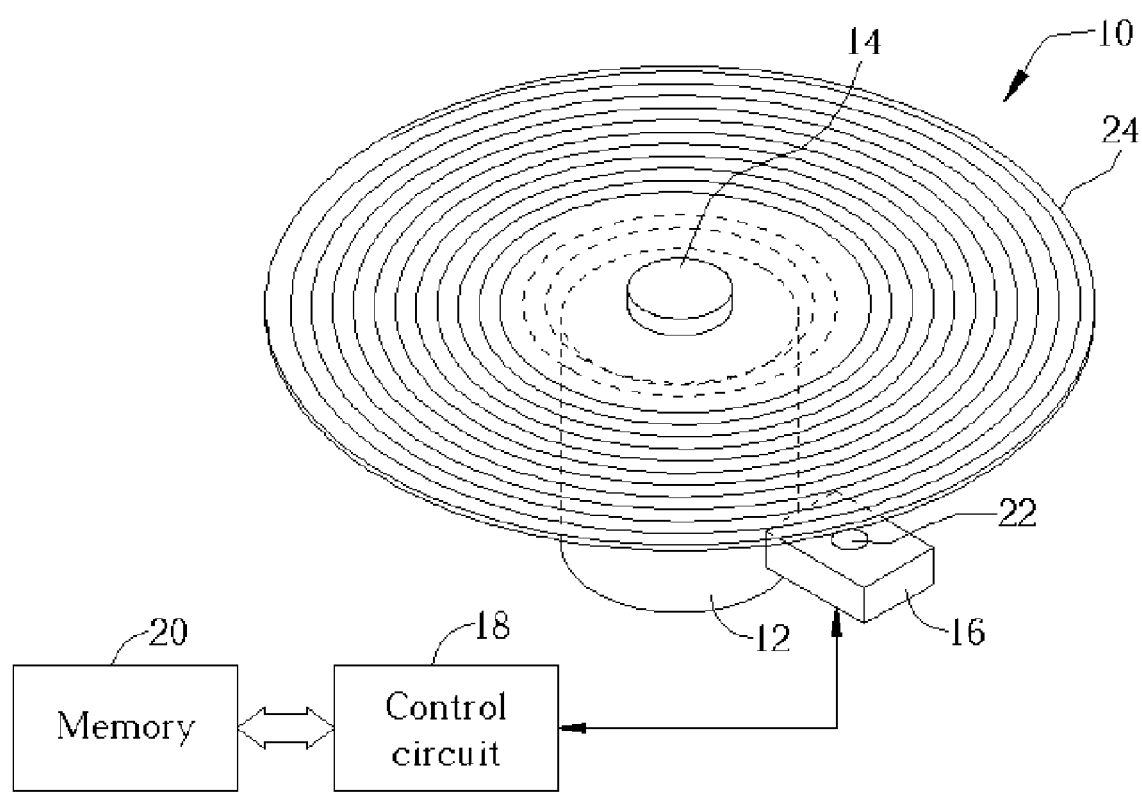
FIG. 6 is a schematic diagram of an optical disc apparatus.

FIG. 6 is a schematic diagram of an optical disc apparatus 10. The optical disc apparatus comprises a memory 20, a control circuit 18, a motor 12, a spindle 14, and a pickup head 16. Also shown in FIG. 6 is an optical disc 24, which may be either a CD or a DVD, loaded on the rotor 14. The memory comprises programs for operation of the optical disc apparatus 10 according to the present invention and may also function as a storage area for data read from or to be written to the optical disc 24. Under control of the control circuit 18, the motor 12 spins the spindle 14 that rotates the optical disc 24 across the pickup head 16. Included in the control circuit 18 are one or more timers, preferably hardware timers, but software implemented timers may be also be possible. The pickup head 16 comprises a laser for emitting light onto the optical disc 24, a focusing lens 22 for focusing the emitted light on a precise location within the optical disc 24, and optical sensors for generating signals according to the light reflected from the optical disc 24.

As previously noted, for proper functionality and to avoid possible damage to the optical disc 24, the optical disc apparatus should utilize a laser having a wavelength optimized for the specific type of optical disc 24. Normally, the pickup head 16 would comprise at least two lasers, one optimized for a CD and a second laser optimized for a DVD, however, only one focusing lens 22 is illustrated in FIG. 6 for clarity.

When determining the type of optical disc 24 currently loaded, the optical disc apparatus 10 utilizes a fixed force to raise the optical focusing lens 22 at a constant velocity. It is to be understood that, in the present invention, the optical disc 24 type may be determined either by raising or by lowering the focusing lens 22. However, for clarity, this disclosure will center on an embodiment where the focusing lens 22 is raised during optical disc 24 type determination.

Light emitted from the laser in the pickup head 16 is focused onto the optical disc 24 by the focusing lens 22. As the focusing lens 22 is raised toward the optical disc 24 (so that a distance between the focusing lens 22 and the optical disc 24 becomes shorter), the focal point of the optical lens 22 moves through the layers of the optical disc. The range of movement of the optical lens 22 is subject to design considerations and not limiting but may fall within a narrow range of between half of the thickness of the optical disc 24 and approximately the thickness of the optical disc 24 for best results.

Figure 1:
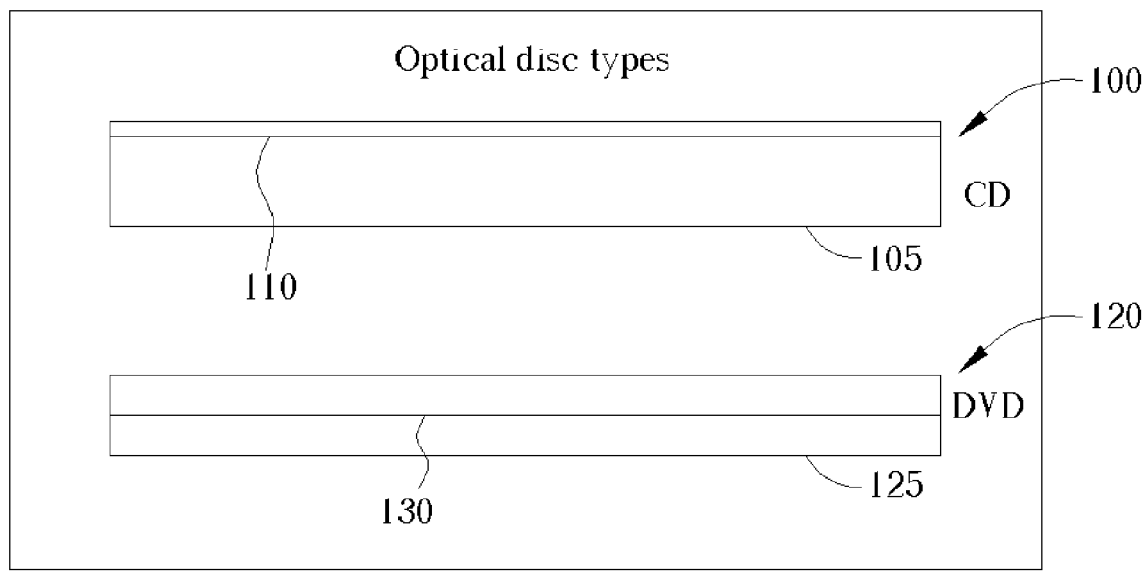
FIG. 1 illustrates the relative locations of surface and data layers in a CD and a DVD.
Figure 2:
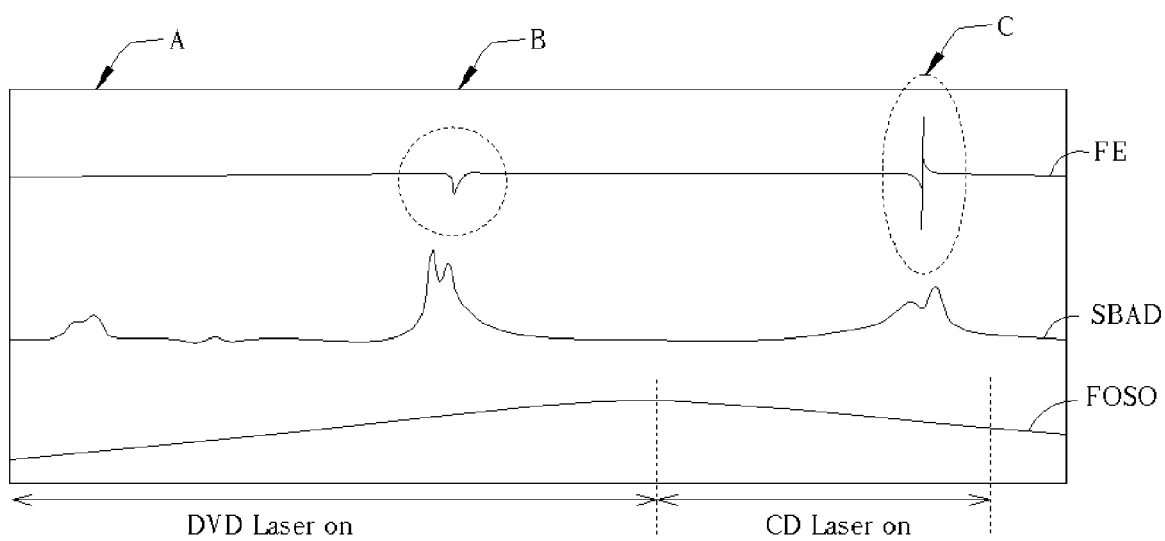
FIG. 2 illustrates one method of determining an optical disc type when the unknown disc is a CD.
Figure 3:
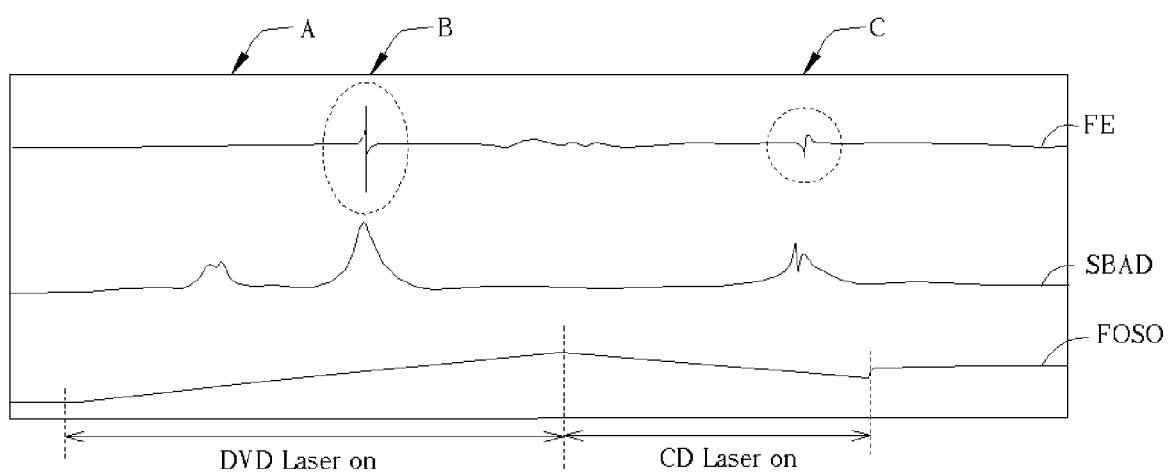
FIG. 3 illustrates the method of FIG. 2 for determining an optical disc type when the unknown disc is a DVD.
Figure 4:
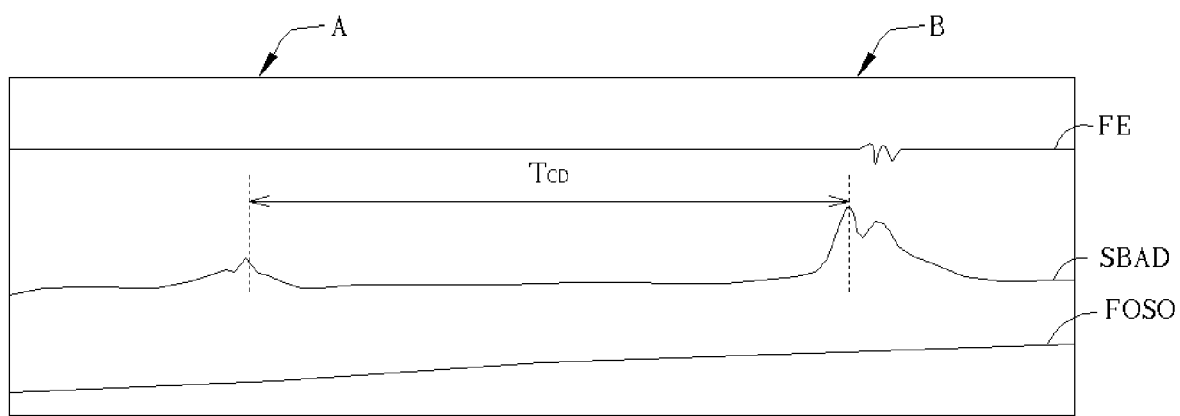
FIG. 4 illustrates a second method of determining an optical disc type when the unknown disc is a CD.
Figure 5:
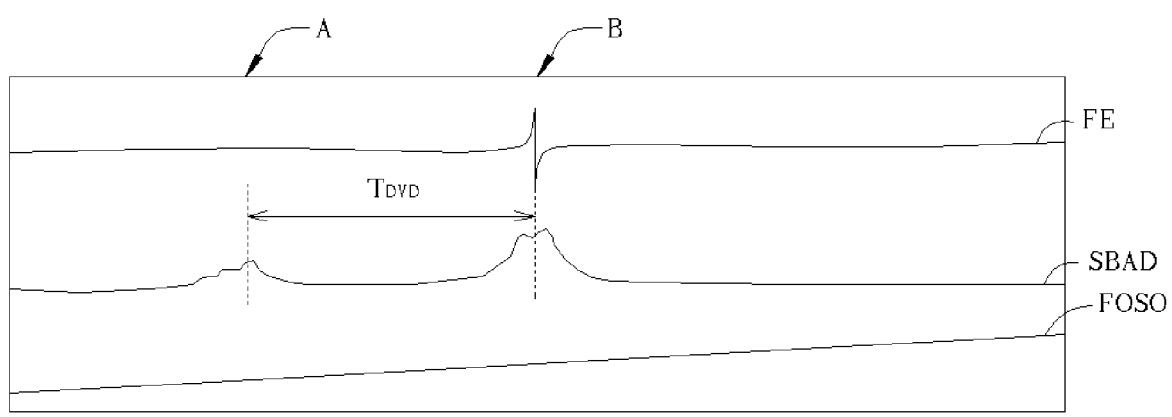
FIG. 5 illustrates the method of FIG. 4 for determining an optical disc type when the unknown disc is a DVD.

Please refer again to FIG. 1 in conjunction with FIG. 6. As the focusing lens 22 is raised closer to the optical disc 24, the focal point of the focusing lens 22 moves to the surface layer 105, 125 of the optical disc 24, then through the surface layer 105, 125, and eventually to and through the data layer 110, 130 of the optical disc 24, and possibly beyond. Reflected light maximizes when the focal point centers on the data layer 110, 130 or the surface layer 105, 125. The optical sensors within the pickup head 16 generate signals according to the reflected light. Normally there are at least four optical sensors for generating a range of signals such as a focus error (FE) and a signal representing a sum of the reflected light received by all four sensors (A+B+C+D) known as SBAD. Also generated is an FOSO signal that indicates the distance between the focusing lens 22 and the surface of the optical disc 24. These generated signals are passed to the control circuit 18 and utilized for controlling operations of the optical disc apparatus 10.

When the optical disc 24 is initially loaded onto the spindle 14, the optical disc apparatus 10 must first distinguish whether the loaded optical disc 24 is a CD or a DVD in order to employ the correct laser for further data processing. Unlike prior art methods that depend upon consistent optical disc reflectivity or a known focusing lens speed, the present invention requires only timers. A first duration is measured that indicates how much time it takes for the moving focal point to pass through a first layer of the optical disc 24. A second duration is also measured that indicates how much time it takes for the moving focal point to move from the first layer to a second layer of the optical disc 24.

Although manufacturing tolerances or other concerns may cause small differences in the thickness of the respective layers of the optical disc 24, these variations are relatively minor when compared with the distance between the surface layer 105, 125 and the data layer 110, 130 of the optical disc 24. Therefore, the present invention effectively compares the thickness of a layer with the distance between layers of the optical disc 24. For example, the distance between the surface layer 105, 125 and the data layer 110, 130 can be divided by the thickness of the surface layer 105, 125 to distinguish the optical disc type.

Figure 7:
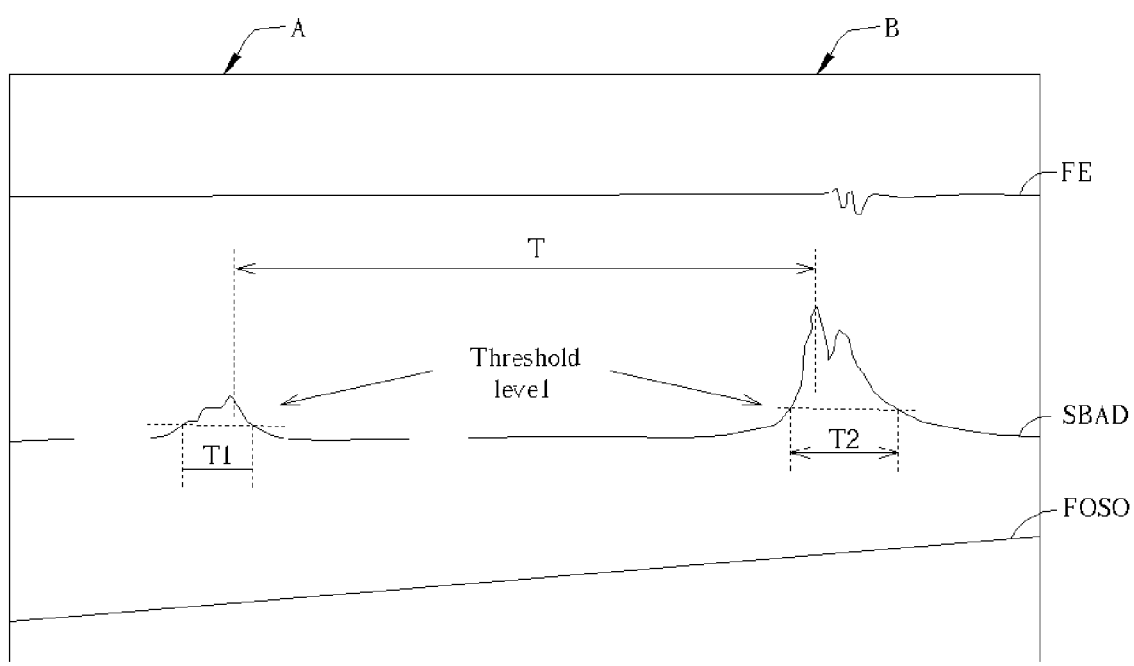
FIG. 7 illustrates determining an optical disc type according to the present invention.

The present invention utilizes only the timers comprised by the optical disc apparatus 10 to find the distances required to obtain the quotient that enables distinguishing the optical disc 24 type. Please refer to FIG. 7, which illustrates an application of the procedure. FIG. 7 is a chart showing example FE, SBAD, and FOSO signals during an optical disc type determination process. As the focusing lens 22 moves toward the optical disc 24 (as shown by the FOSO signal), the focal point of the focusing lens 22 also draws near to the surface layer 105, 125 of the optical disc 24. Because the focal point has not yet reached the surface layer 105, 125, the signals FE and SBAD remain relatively constant and flat. As the focal point reaches the surface layer 105, 125, the surface layer begins to reflect more light, resulting in a jump in the SBAD signal as shown. As the focal point moves through the surface layer 105, 125, the SBAD increases, maximizes at point A, then decreases again as the focal point leaves the surface layer 105, 125. As the lens continues to move toward the optical disc 24, the focal point eventually reaches the data layer 110, 130 where the SBAD signal again jumps, maximizes at point B, and then decreases as the focal point leaves the data layer 110, 130.

To avoid faulty signals due to noise or other causes, a first predetermined threshold can be utilized by the optical disc apparatus 10 to know when the SBAD signal indicates that the focal point has reached, or left, the surface layer 105, 125. A second predefined threshold can also be utilized by the optical disc apparatus 10 to know when the SBAD signal indicates that the focal point has reached, or left, the data layer 110, 130. Values for the first and the second predefined thresholds can be determined experimentally. When the SBAD signal exceeds the first predetermined threshold, the optical disc apparatus starts a first timer. The first timer is stopped when the SBAD signal no longer exceeds the first predetermined threshold. The duration (called a first duration and shown as T1 in FIG. 7) indicated by the first timer approximately equals the amount of time taken for the focal point to move through the surface layer 105, 125 of the optical disc 24. A second timer is started when the SBAD signal peaks above the first predefined threshold, indicating that the focal point is approximately centered within the surface layer 105, 125. The second timer is stopped when the SBAD signal peaks above the second predefined threshold, indicating that the focal point is approximately centered within the data layer 110, 130. It may be possible to start and stop the second timer at points other than peaks above the respective thresholds, such as when the SBAD signal initially exceeds or decreases below the respective thresholds without departing from the spirit of the invention. The importance of the second timer is to know the amount of time (called a second duration and shown as T in FIG. 7) that it takes the focal point to travel from a known point in the surface layer 105, 125 to a known point in the data layer 110, 130. A third timer can also be utilized similarly to record a third duration (shown as T2 in FIG. 7) for the traversal of the data layer 110, 130.

Once the first and second durations are known, the type of optical disc 24 currently loaded on the spindle 14 can be accurately determined without the prior art necessity of considering the speed with which the focusing lens is moved. Time=Distance/Velocity. Therefore, $T=X/V$, $T1=X1/V$, and $T2=X2/V$. Here, X is the distance between the surface layer 105, 125 and the data layer 110, 130, X1 is the thickness of the surface layer 105, 125, X2 is the thickness of the data layer 110, 130, and T, T1, and T2 are the second, the first, and the third durations respectively. Because the velocity of the focusing lens 22 is substantially constant, these simple equations can be combined to eliminate the velocity factor.

For example, if $T=X/V$ and $T1=X1/V$, then $T/T1=(X/V)/(X1/V)=X/X1$. Alternatively, if $T=X/V$ and $T2=X2/V$, then $T/T2=(X/V)/(X2/V)=X/X2$. Note that X/X1 is the ratio of the distance between the surface layer 105, 125 and the data layer 110, 130 to the thickness of the surface layer 105, 125. Because T (the second duration) and T1 (the first duration) are both known, the ratio of X/X1 is easily calculated and the optical disc 24 type can be accurately determined. The optical disc 24 type can be just as easily calculated using the formula T/T2 that indicates the ratio of the distance between the surface layer 105, 125 and the data layer 110, 130 to the thickness of the data layer 110, 130. Either or both methods may be used. Additionally, the above-described durations may just as easily be calculated with the focusing lens 22 moving away from the optical disc 24 as when the focusing lens 22 is moving toward the lens. Both methods are intended to fall within the intended scope of the present invention.

The quotient resulting from T/T1 (second duration/first duration) or from T/T2 (second duration/third duration) can be used to determine optical disc 24 type. If the quotient falls within a first range, the optical disc 24 is determined to be a DVD. If the quotient falls within a second range, the optical disc 24 is determined to be a CD. The specific values that can be used to indicate the respective ranges can be determined by experimentation using optical discs from many manufacturers in optical disc apparatus from many different manufactures. As stated, the distance between the surface layer 105 and the data layer 110 of a CD is approximately twice the distance between the surface layer 125 and the data layer 130 of a DVD. Therefore, despite manufacturing tolerances, the first range and the second range of the quotient results do not overlap and would normally be separated by a large gap between the ranges, allowing for accurate optical disc 24 type determination.

Figure 8:
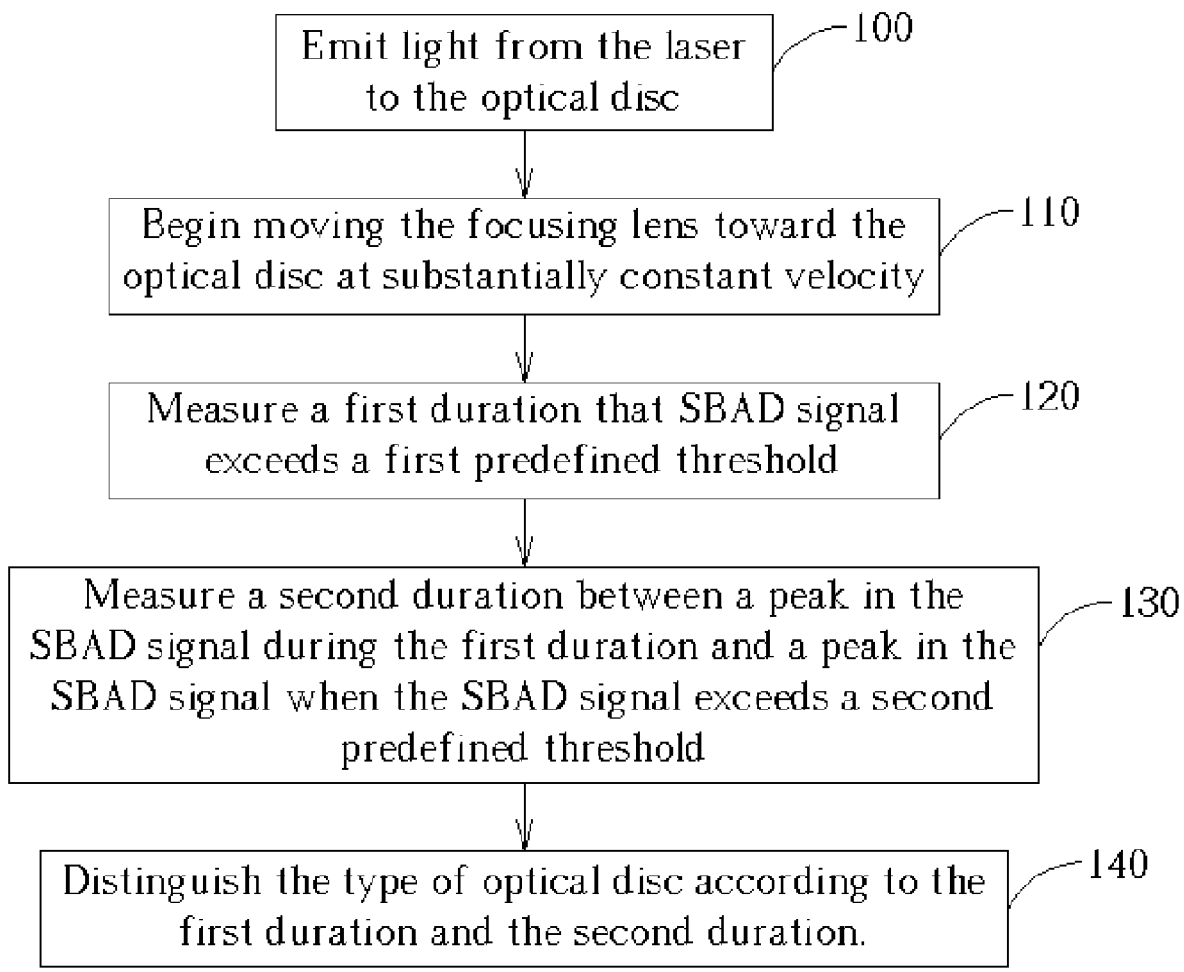
FIG. 8 is a flow chart of distinguishing an optical disc type according to the present invention.

FIG. 8 presents a flow chart of the present invention. First (Step 110), light is emitted from a laser in the pickup head 16. Either a laser optimized for a CD or a laser optimized for a DVD may be used during the optical disc type determination process. The emitted light passes through the focusing lens 22 towards the optical disc 24. Next in Step 110, the focusing lens 22 is moved towards (or possibly away from) the optical disc 24 at constant velocity. With the focusing lens moving, a first duration that the SBAD signal exceeds the first predefined threshold (Step 120) is measured. During the first duration, preferably at a peak in the SBAD signal, a second timer is started (Step 130) to measure a second duration. The second timer is stopped, preferably at a peak in the SBAD signal, during a third duration when the SBAD signal exceeds a third predefined threshold. Then, in Step 140, the optical disc type is distinguished according to the ratio of the second duration to the first duration.

An optical disc apparatus according to the present invention would include the spindle 14, the motor 12, the pickup head 16, the focusing lens 22, the control circuit 18, and the memory 20 shown in FIG. 6. The pickup head 16 includes at least one laser for emitting light to the optical disc and optical sensors for generating signals according to the light reflected from the optical disc. The control circuit includes timers utilized during the optical disc type determination process. Additionally, the memory 20, which may be of any type of flash memory, ROM, or RAM, should comprise computer code capable of distinguishing optical disc 24 type according to the present invention, which may include values indicating the first and second predefined thresholds and values indicating the result ranges to be used for determining the optical disc 24 type. The predefined threshold levels would preferably also be stored in the memory 20.

In conclusion, the present invention eliminates the prior art problems of requiring consistency in optical disc reflectivity across types and manufacturers and further overcomes constraints necessitating different optical disc type determination systems for different optical disc apparatus having different focusing lens velocities due to manufacturing tolerances and design considerations. The present invention removes the velocity factor by calculating the first duration, that of time taken to transverse a first layer of the optical disc, and a second duration, that of time taken to move from a known location in the first layer to a known location in a second layer of the optical disc. The ratio of the second duration to the first duration approximates the ratio of the distance between the first and second layers of the optical disc to the thickness of the first layer and can be compared with predefined independent ranges of results to accurately determine optical disc type.

Those skilled in the art will readily observe that numerous modifications and alterations of the device and method may be made while retaining the teachings of the invention. For example, obviously a ratio of the first duration to the second duration or any ratio combining the second and third durations, along with accompanying alterations in the ranges of results, may also be used without departing from the spirit of the invention. Accordingly, the above disclosure should be construed as limited only by the metes and bounds of the appended claims.

The invention claimed is:

1. A method for distinguishing the type of optical disc in an optical disc apparatus, the optical disc apparatus comprising a laser, a focusing lens, and a sensor for generating a signal corresponding to laser emitted light reflected from the optical disc, the method comprising:

emitting light from the laser to the optical disc;

moving the focusing lens such that a focal point of the focused light emitted from the laser moves through the optical disc at substantially constant velocity;

while the lens is moving, measuring a first duration that the generated signal exceeds a first predefined threshold, the first predefined threshold indicating that the focal point of the focused emitted light is within a first layer of the optical disc;

while the lens is moving, measuring a second duration between a first predetermined location in the generated signal during the first duration and a second predetermined location in the generated signal when the generated signal exceeds a second predefined threshold, the second predefined threshold indicating that the focal point of the focused emitted light is within a second layer of the optical disc;

distinguishing the type of optical disc according to the first duration and the second duration.

2. The method of claim 1 wherein if a ratio of the second duration to the first duration exceeds a predefined value, the optical disc is distinguished as a CD, and if the ratio of the second duration to the first duration does not exceed a predefined value, the optical disc is distinguished as a DVD.

3. The method of claim 1 wherein the first duration approximately indicates the amount of time taken for the focal point of the focused emitted light to pass through the first layer of the optical disc.

4. The method of claim 3 wherein the second duration approximately indicates the amount of time taken for the focal point of the focused emitted light to pass from the first layer to the second layer of the optical disc.

5. The method of claim 4 wherein a ratio of the second duration to the first duration approximately equals a ratio of a distance between the first layer and the second layer of the optical disc to a thickness of the first layer.

6. The method of claim 1 wherein the first layer is a surface layer of the optical disc and the second layer is a data layer of the optical disc.

7. The method of claim 1 wherein the first layer is a data layer of the optical disc and the second layer is a surface layer of the optical disc.

8. The method of claim 1 wherein the first predetermined location is the location recording a maximum SBAD signal within the first duration.

9. A method for distinguishing the type of optical disc in an optical disc apparatus, the optical disc apparatus comprising a laser, a focusing lens, and a sensor for generating a signal corresponding to laser emitted light reflected from the optical disc, the method comprising:

measuring a first duration in which the generated signal exceeds a first predefined threshold, the first predefined threshold indicating that the focal point of the focused emitted light is within a first layer of the optical disc;

measuring a second duration between a first predetermined location in the generated signal during the first duration and a second predetermined location in the generated signal when the generated signal exceeds a second predefined threshold, the second predefined threshold indicating that the focal point of the focused emitted light is within a second layer of the optical disc;

distinguishing the type of optical disc according to a ratio of the second duration to the first duration.

10. The method of claim 9 wherein if the ratio of the second duration to the first duration falls within a first range of values, the optical disc is distinguished to be a DVD.

11. The method of claim 9 wherein the first duration approximately indicates the amount of time taken for the focal point of the focused emitted light to pass through the first layer of the optical disc.

12. The method of claim 9 wherein the first layer is a surface layer of the optical disc.

13. The method of claim 9 wherein the first layer is a data layer of the optical disc.

14. The method of claim 9 wherein the first predetermined location is the location where a maximum SBAD signal is generated within the first duration.

15. An optical disc apparatus comprising:
a laser;
a focusing lens for focusing light emitted from the laser onto an optical disc;
a sensor for generating a signal corresponding to laser emitted light reflected from the optical disc; a control circuit for determining a type of optical disc by calculating a result; and
a memory, the memory comprising:
a first predefined threshold used to determine when a focal point of the focusing lens is within a first layer of the optical disc according to the generated signal;
a second predefined threshold used to determine when a focal point of the focusing lens is within a second layer of the optical disc according to the generated signal; and
a predefined third value indicating a result range enabling optical disc type determination;
wherein the result is a ratio of a second duration required for the focal point to move from the first layer to the second layer and a first duration where the generated signal exceeds the first predefined threshold.

16. The optical disc apparatus of claim 15 wherein if the ratio exceeds the predefined third value, the optical disc is distinguished as a CD.

17. The optical disc apparatus of claim 15 wherein the ratio of the second duration to the first duration approximately equals a ratio of a distance between the first layer and the second layer of the optical disc to a thickness of the first layer.

18. The optical disc apparatus of claim 15 wherein the first layer is a surface layer of the optical disc.

19. The optical disc apparatus of claim 15 wherein the first layer is a data layer of the optical disc.

* * * * *